(12) United States Patent
Sudau

(10) Patent No.: US 6,244,134 B1
(45) Date of Patent: Jun. 12, 2001

(54) TORSIONAL VIBRATION DAMPER

(75) Inventor: Jörg Sudau, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/196,040

(22) Filed: Nov. 19, 1998

(30) Foreign Application Priority Data

Nov. 27, 1997 (DE) .............................. 197 52 667

(51) Int. Cl.⁷ ................................... F16F 15/10
(52) U.S. Cl. ................... 74/574; 74/572; 464/68
(58) Field of Search ................... 74/572–574; 464/66, 464/68, 69; 192/30 V

(56) References Cited

U.S. PATENT DOCUMENTS

| | | | |
|---|---|---|---|
| 4,467,905 | * 8/1984 | Takeuchi | 192/106.2 |
| 5,557,984 | 9/1996 | Cooke et al. | 74/574 |
| 5,697,845 | 12/1997 | Curtis | 464/3 |
| 5,819,598 | * 10/1998 | Cooke et al. | 74/574 |
| 5,836,217 | * 11/1998 | Sudau et al. | 74/574 |
| 5,941,134 | * 8/1999 | Cooke et al. | 74/574 |
| 5,976,020 | * 11/1999 | Lohaus et al. | 464/3 |
| 6,012,355 | * 1/2000 | Sudau | 74/574 |

FOREIGN PATENT DOCUMENTS

| | | | |
|---|---|---|---|
| 42 00 174 A1 | 8/1992 | (DE) | F16F/15/30 |
| 2 752 895 | 9/1997 | (FR) | F16F/15/30 |
| 2 767 171 | 8/1998 | (FR) | F16F/15/30 |
| 2 190 977 | 12/1987 | (GB) | F16D/3/10 |
| 2 265 437 | 9/1993 | (GB) | F16F/15/12 |
| 2 318 169 | 4/1998 | (GB) | F16F/15/14 |
| 2 326 459 | 12/1998 | (GB) | F16F/15/131 |
| 2 329 447 | 3/1999 | (GB) | F16F/15/123 |
| 94/10477 | 5/1994 | (WO) | F16F/15/12 |
| 94/20769 | 9/1994 | (WO) | F16F/15/12 |
| WO 98/51940 | * 11/1998 | (WO) | 74/574 |

* cited by examiner

Primary Examiner—Vinh T. Luong
(74) Attorney, Agent, or Firm—Cohen, Pontani, Lieberman & Pavane

(57) ABSTRACT

A torsional vibration damper for a drive train of a motor vehicle comprises two flywheel mass arrangements which are rotatable both jointly and relative to one another about a common axis of rotation. The two flywheel mass arrangements are coupled by a coupling mass arrangement for transmitting torsional force. The coupling mass arrangement comprises a first bearing region movably mounted for translational motion along a first guide track on the first flywheel arrangement for transmitting torsional forces to the first flywheel mass. A second bearing region is arranged at a distance from the first bearing region on the coupling mass arrangement movable in translational motion along a second guide track on the second flywheel mass arrangement for transmitting torsional forces to the second flywheel mass.

14 Claims, 8 Drawing Sheets

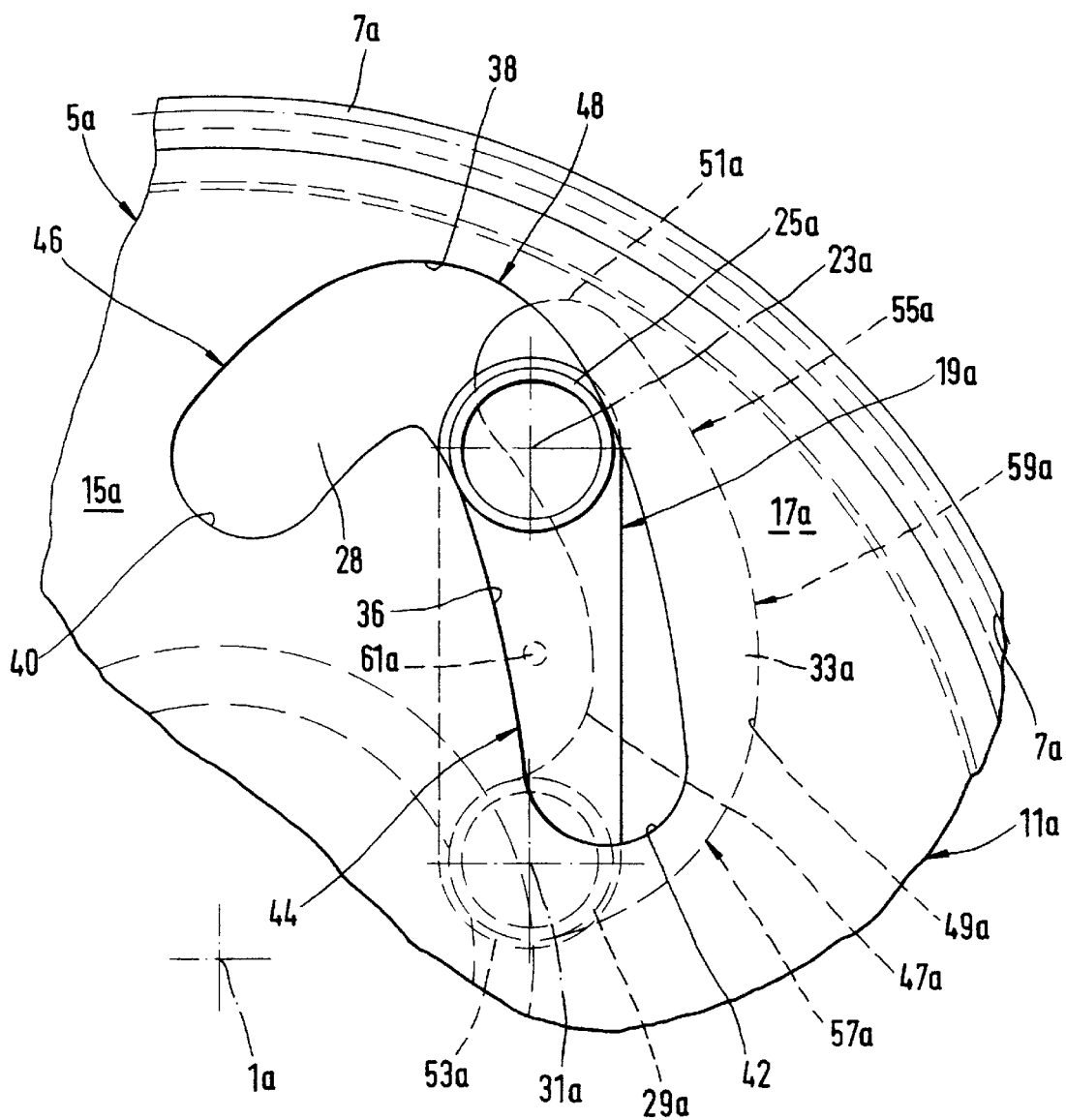

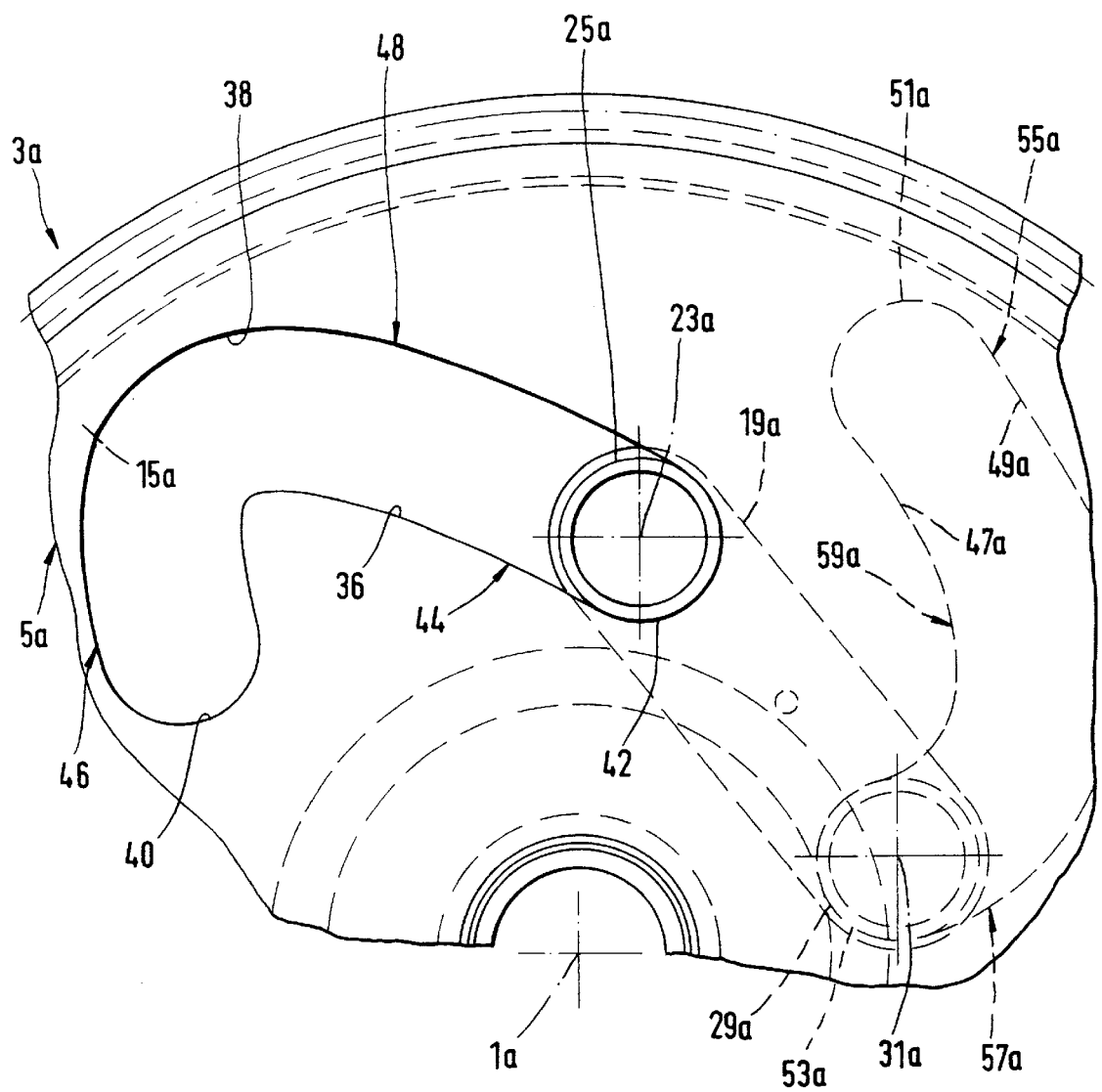

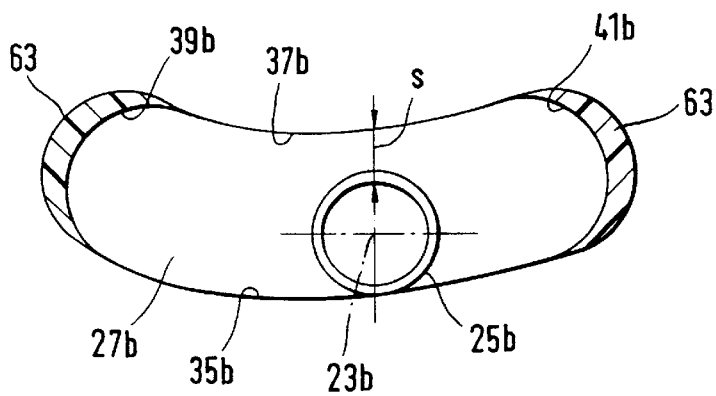
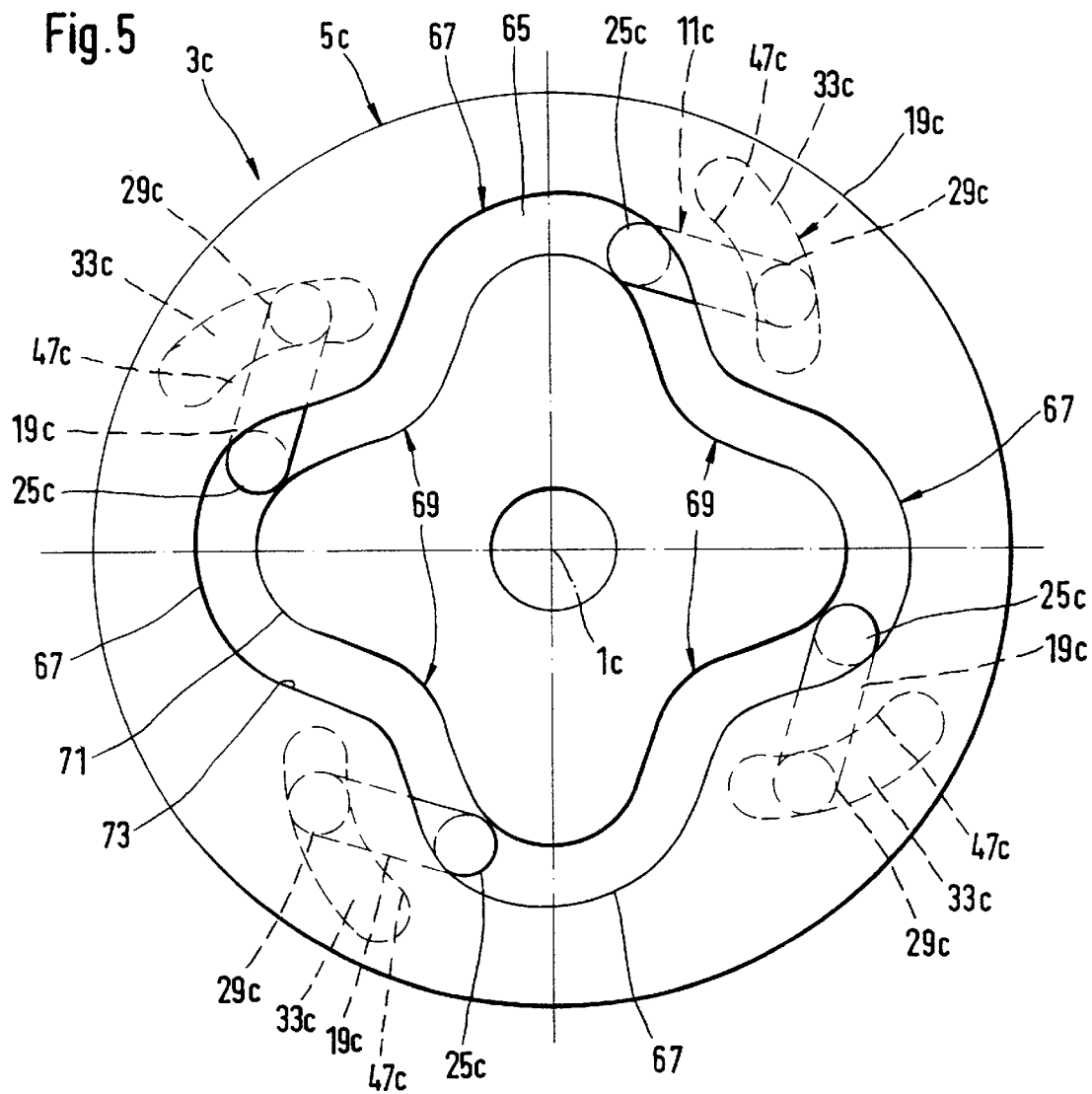

TORSIONAL VIBRATION DAMPER

BACKGROUND OF THE INVENTION

1. Field of the Invention

The invention relates to a torsional vibration damper for arrangement in a drive train of a motor vehicle.

2. Description of the Related Art

For the damping of torsional vibrations in the drive train of an automobile, prior art reference DE 42 00 174 A1 discloses a prior art torsional vibration damper comprising two flywheel mass arrangements which are rotatable both jointly and relative to one another about a common axis of rotation. Coupling mass arrangements that are uniformly distributed about the axis of rotation are used to couple the two flywheel mass arrangements for transmitting torsional forces therebetween. Each of the coupling mass arrangements includes a pendulum weight that is pivotally mounted on a first of the two flywheel mass arrangements about a pivot axis oriented parallel to the axis of rotation. In an operating state in which no torque is transmitted between the two flywheel mass arrangements, the pendulum weight is oriented essentially radially due to the centrifugal force acting on the pendulum weight. Each of the coupling mass arrangements also includes an elongate connecting member which is oriented essentially circumferentially. One end of the elongate member is articulately connected to the second flywheel mass arrangement and the other end of the elongate member is articulately connected to the pendulum weight at a point arranged radially outside the pivot axis of the pendulum weight. A torque to be transmitted between the two flywheel masses during operation introduces a force via the connecting member to the pendulum weight. The force attempts to pivot the pendulum weight about its pivot axis counter to the action of the centrifugal force. The two flywheel mass arrangements rotate relative to one another until an equilibrium is established between the centrifugal force acting on the pendulum weight and the torque transmitted by the connecting member. The relative rotation of the two flywheel mass arrangements is counteracted by a force determined essentially by the inert masses of the two flywheel mass arrangements and of the coupling mass arrangements and by the moments of inertia of the pendulum weights, thereby causing the uncoupling or damping of torque fluctuations.

In this known torsional vibration damper, the torsional vibration damping properties and the profile of the restoring force acting between the two flywheel mass arrangements, which are directed toward the position of equilibrium, are a function of the rotational speed and the rotational deflection of the two flywheel mass arrangements. The torsional vibration damping properties and the profile of the restoring force acting between the two flywheel mass arrangements may be adjusted by changing characteristics of the coupling mass arrangement such, for example, as the length of the connecting member, the distance between the pivot bearing of the pendulum weight and the articulated connection between the pendulum weight and the connecting member, and the mass distribution of the pendulum weight. However, the basic profile of the restoring force is not adaptable to any profile which may be desired, because the restoring force is an invariable function of the rotational speed.

SUMMARY OF THE INVENTION

It is an object of the present invention to provide a torsional vibration damper with two flywheel mass arrangements coupled by at least one coupling mass arrangement, in which damper the torsional vibration damping properties are more easily adjustable.

The present invention includes a torsional vibration damper arrangeable in a drive train of a motor vehicle having two flywheel mass arrangements which are rotatable both jointly and relative to one another about a common axis of rotation and which are coupled by a coupling mass arrangement for the transmission of torsional force.

According to the invention, the coupling mass arrangement comprises a first bearing region for transmitting torsional forces to a first of the two flywheel mass arrangements. The first bearing region is movable in translational motion along a first guide track provided on the first flywheel mass arrangement. The coupling mass arrangement also comprises a second bearing region for transmitting torsional forces to a second of the two flywheel mass arrangements. The second bearing region is arranged at a distance from the first bearing region along a plane oriented transversely to the axial direction, and which can be moved in translational motion along a second guide track provided on the second flywheel mass arrangement.

The construction of tee torsional vibration damper according to the invention affords design possibilities which enable the adjustment of the torque transmission properties as a function of the transmitted torque and the rotational speed. These design possibilities include, in addition to the dimensioning of the distance between the two bearing regions and the mass distribution of the coupling mass arrangement, the design of the shape of the run of the guide tracks.

In an appropriate design of the guide tracks, the two flywheel mass arrangements and the coupling mass arrangement assume a position of equilibrium relative to one another at a given rotational speed and at a given torque to be transmitted. In this design, the centrifugal force acting on the coupling mass arrangement attempts to press the coupling mass arrangement radially outward. To counter this, a torsion transmission force transmitted by the coupling mass arrangement between the two flywheel mass arrangements and directed essentially circumferentially attempts to press at least one bearing region of the coupling mass arrangement radially inward. In response to a change in the transmitted torque or a change in the rotational speed, the bearing regions on the coupling mass arrangement are displaced in translational motion along the guide tracks by a rotation of the two flywheel mass arrangements relative to one another until a new position of equilibrium is reached If a torque fluctuation occurs, the two flywheel mass arrangements rotate relative to one another, starting from such a position of equilibrium, at least one of the two bearing regions of the coupling mass arrangement experiencing acceleration and being displaced along its guide track. This displacement of at least one bearing region causes a displacement of the center of gravity and/or a displacement of the rotary position of the coupling mass arrangement with respect to the flywheel mass arrangements. Due to the accompanying acceleration, the displacement of the center of gravity and/or the rotary position introduces a force counteracting the rotation of the two flywheel mass arrangements relative to one another. This force damps the torque fluctuation finally transmitted. The force counteracting a relative rotation of the two flywheel mass arrangements is determined by the position of equilibrium, which the flywheel mass arrangements and the coupling mass arrangement assume relative to one another at a given rotational speed and at a given transmitted torque. The force is also determined by the design of the guide tracks in the regions in which the bearing regions of the coupling mass arrangements are in bearing contact in this position of equilibrium. More specifically, the inclination of the guide tracks with respect to the radial direction determines the extent to which the bearing regions are radially inwardly or radially outwardly displaced and to what translational accelerations and rotational accelerations the coupling mass arrangements are therefore exposed.

During operation, as a rule, the first and second bearing regions bear on the guide tracks due to the centrifugal force acting on the coupling mass arrangement. However, particularly in the case of torque fluctuations, situations may arise in which at least one of the bearing regions lifts off from its guide track and is therefore not in contact with it. To restrict the movement of a bearing region away from one of the guide tracks, a further guide track located opposite the first or second guide track such that the further guide track faces at least a portion of the first and/or second guide track. The run of the first and/or second guide track and the run of the further guide track may be designed such that the corresponding bearing region bears on the first or second guide track in the event of a torsion transmission force acting in a first direction, for example during traction, and bears on the further guide track in the event of a torsion transmission force acting in the direction opposite to the first direction, for example during coasting.

The distance between the first and/or second guide track and the further guide track may be selected such that the corresponding bearing region is guided between these guide tracks with play perpendicularly to the guide tracks. This then leads to rotational play between the two flywheel mass arrangements, which may be utilized, for example, during a translation from coasting to traction.

On the other hand, the distance between the first or second and the further guide track may be adjusted such that the corresponding bearing region is guided between these substantially free of play. This adjusted distance produces a defined position of the bearing region between the guide tracks guiding it and, consequently, to a defined reaction of the torsional vibration damper to torque fluctuations which occur.

In a preferred embodiment, the first and/or the second guide track preferably has a limited length, along which the corresponding bearing regions of the coupling mass arrangement moves. Therefore, the two end regions of the first and/or the second guide track are provided with an end stop limiting the translational movement of the bearing region along the guide track. When a bearing region bears on one of these two end stops, the bearing region does not necessarily come into a position of equilibrium in which the displacement of bearing region damps the torque fluctuations. However, even though the end stop may prevent the bearing region from reaching a position of equilibrium, such an end stop limiting the movement of the bearing region may also afford advantages. For example, when both the first and second guide tracks have such an end stop, the amount of rotational deflection of the two flywheel mass arrangements relative to one another is limited. Therefore, it is possible to ensure that even the highest torques to be transmitted are transmitted reliably, without the coupling mass arrangement yielding to the torque force to be transmitted.

In a preferred embodiment, it is advantageous that at least one of the end stops comprises an elastic damping element, so that, when the bearing region butts onto the end stop, no torque shocks and knocking noises are generated.

Although the guide tracks may have a rectilinear run in a plane oriented transversely to the axis of rotation, it is advantageous if the first and/or second guide track has a curved run. Specifically, curved guide tracks may be optimized in a simple way, to the effect that the coupling mass arrangement assumes a defined position of equilibrium quickly and reliably during operation.

The curved guide tracks extend both in the radial and in the circumferential direction. A bearing region bears in a radially outer region of the guide track at high rotational speeds and/or during transmission of low torques and in a radially inner region at low rotational speeds and/or during the transmission of high torques. Furthermore, in the preferred embodiment, a bearing region bears in regions of its associated guide track that have a small angle with respect to the circumferential direction at high rotational speeds and/or during transmission of low torques, while the bearing region bears in regions of the guide track which have a large angle with respect to the circumferential direction at low rotational speeds and/or during transmission of high torques.

In an advantageous design of the guide track, a radially inner end region of the guide track is oriented to a greater extent in the circumferential direction than the radially outer end region of this guide track. In this case, it is advantageous, in particular, if the radially inner end region is oriented substantially in the circumferential direction.

It is likewise preferred to have a guide track which has a U-shaped run and therefore a relatively high degree of curvature, so that the end regions of the guide track form legs which are connected by a U-shaped middle region of the guide track.

Preferably, the U-shaped guide track is oriented in such a way that the U-bend opens substantially in the circumferential direction such that the two legs are arranged before or after the U-bend in the circumferential direction, with respect to a plane oriented transversely to the axis of rotation. The U-shaped guide track is preferably oriented such that the U-bend opens substantially radially inward and such that the two legs and end regions of the guide track being arranged radially within the U-bend.

It is preferred, furthermore, to have a combination of two guide tracks, each of which is in engagement with a bearing region of a coupling mass arrangement, in which a radially inner region of the first guide track is oriented to a greater extent in the circumferential direction than the radially outer end region of the first guide track. The second guide track is designed with a U-bend which opens substantially in the circumferential direction. In this preferred embodiment, the radially inner end region of the first guide track is arranged radially between the end regions of the second guide track. That is, the radially inner end region of the first guide track is radially within the region of the U-bend of the second guide track. It is likewise preferred that the radially outer end region of the second guide track extends further radially outward than the radially outer end region of the first guide track.

The orientation of the guide tracks in the circumferential direction is preferably selected such that the radially outer end region of the first guide track is arranged before the radially inner end region of the first guide track in a circumferential direction, and that the end regions of the second guide track are arranged before the U-bend in the circumferential direction.

The U-shaped second guide track is preferably designed such that its radially outer end region is arranged before the radially inner end region in the circumferential direction.

In another embodiment, each of the two guide tracks, which are in each case in engagement with a bearing region of a coupling mass arrangement, has a U-shaped run. The U-bend of the first guide track opens substantially radially inward and the U-bend of the second guide track opens substantially circumferentially. In this embodiment, a second end region of the second guide track follows a first end region of the first guide track in a circumferential direction and is arranged radially within the first end region. A radially inner end region of the second guide track is arranged after a radially outer end region of the second guide track in the circumferential direction.

Instead of a guide track having a limited length, a further embodiment includes a continuous guide track which extends over the entire circumference of its flywheel mass arrangement. In this embodiment, the continuous guide track includes regions which run radially outward and regions which run radially inward. The corresponding bearing region of the coupling mass arrangement are capable of coming to bear on the radially outward and radially inward regions for the transmission of torques. Such a guide track offers simple overload protection, since the two flywheel mass arrangements are rotatable relative to one another to an unlimited extent.

In a further embodiment, two guide tracks engage a coupling mass arrangement such that the coupling mass arrangement can be transferred from a first position, in which the first bearing region is arranged before the second bearing region in a circumferential direction, to a second position, in which the first bearing region is arranged after the second bearing region in the circumferential direction. Complete rotations of the coupling mass arrangement about an axis of rotation oriented parallel to the axis of the flywheel mass arrangement are thereby possible. The result of this possible rotation is that the coupling mass arrangement can absorb an angular momentum particularly effectively for the purpose of the damping of torque fluctuations and the two bearing regions of a coupling mass arrangement are always be subjectable to a pull away from one another, irrespective of whether the torsional vibration damper is in a traction or a coasting mode.

In an especially reliable embodiment of the torsional vibration damper, particularly in conjunction with the further guide track located opposite the first and/or second guide track, the bearing region has a circular cross section with respect to a plane oriented transversely to the axial direction. The circular bearing region preferably comprises a roller which rolls on the guide track and which is mounted on the coupling mass arrangement by a rotary bearing such as a rolling bearing or a sliding bearing. This arrangement allows a low-wear translational movement of the bearing region along the guide track.

The first and/or second flywheel mass arrangements are preferably designed, in the region of its guide track, as an annular disk part extending radially. A recess in the annular disk has a boundary which forms at least the first or second guide track and, if appropriate, the further guide track located opposite the first or second guide track. The boundary may also form, if appropriate, the end stops of the guide track. This annular disk part is preferably designed as a sheet metal form.

Both flywheel mass arrangements are preferably designed, in the region of their guide tracks, as annular disk parts which are arranged axially next to one another and between which a connecting part of the coupling mass arrangement extends. The connecting part connects the two bearing regions of the coupling mass arrangement.

The second flywheel mass arrangement is preferably mounted relative to the first flywheel mass arrangement by a rotary bearing, particularly a rolling bearing or a sliding bearing.

Furthermore, for coupling the two flywheel mass arrangements, a plurality of coupling mass arrangements may be arranged to be distributed uniformly about the axis of rotation of the torsional vibration damper. In this case, each bearing region of the coupling mass arrangements may be assigned its own guide track on one of the flywheel mass arrangements so that a plurality of guide tracks uniformly distributed about the axis of rotation are arranged on each of the flywheel mass arrangements. Each of the plurality of guide tracks may be designed identically, so that identical engagement conditions prevail on each of the coupling mass arrangements. However, the individual guide tracks of a flywheel mass arrangement may also be designed differently from one another. Furthermore, a plurality of bearing regions of coupling mass arrangements may be capable of bearing on one guide track.

The torsional vibration damper of the present invention is preferably combined with a friction clutch so that it is part of a clutch disk. The torsional vibration damper may also be combined with a torque converter so that it is preferably part of a bridging clutch of the torque converter. The torsional vibration damper is likewise preferably part of a two-mass flywheel, in which case the first flywheel mass arrangement is connected to a crankshaft of an internal combustion engine and the second flywheel mass arrangement comprises a clutch friction surface for bearing on a clutch lining. If the torsional vibration damper comprises part of a two-mass flywheel, it is preferred, furthermore, that the second flywheel mass arrangement rotatably contacts the radially inner side of the rotary bearing.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 is a partial longitudinal sectional view showing a torsional vibration damper according to the present invention along line I—I in FIG. 2a;

FIGS. 3a–3c are views along the direction of the axis of rotation of another embodiment of the torsional vibration damper of FIG. 1 showing different relative rotary positions of its two flywheel mass arrangements;

FIG. 4 shows another embodiment of a guide track illustrated in the torsional vibration damper of FIGS. 2a–2c, and FIG. 5 is a view along the direction of the axis of rotation, of a further embodiment of the torsional vibration damper of FIG. 1.

DETAILED DESCRIPTION OF THE PRESENTLY PREFERRED EMBODIMENTS

Figure 1:
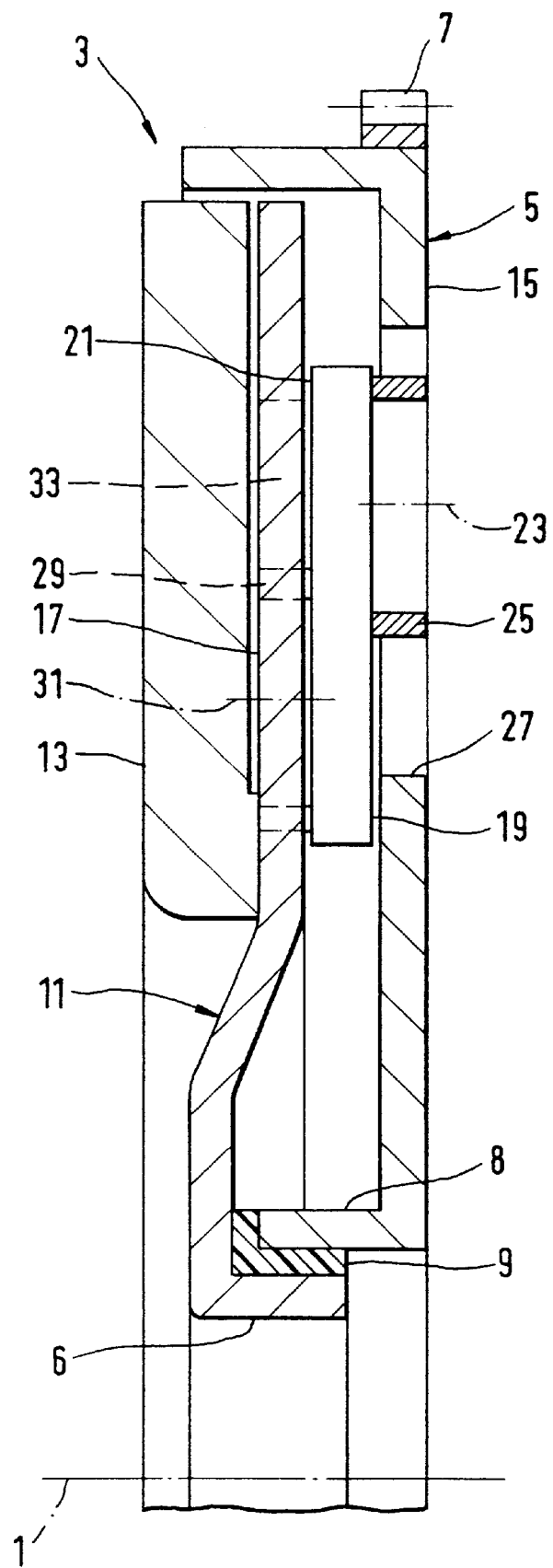

FIG. 1 shows a partial sectional view of a torsional vibration damper 3, rotatable about an axis of rotation 1. The torsional vibration damper 3 comprises a first flywheel mass arrangement 5 which is intended to be fastened to a crankshaft of an internal combustion engine of an automobile and which carries a starter gear ring 7 on its outer circumference, and a second flywheel mass arrangement 11, which has a clutch friction surface 13, rotatably mounted about the axis of rotation 1 on the first flywheel mass arrangement 5 by a rolling bearing 9. In this case, a hub part 6 of the second flywheel mass arrangement 11, the roller bearing 9 and a hub part 8 of the first flywheel mass arrangement 5 are arranged in radial outward succession.

The first flywheel mass arrangement 5 comprises a sheet metal part 15 radially extending between the starter gear ring 7 and the rolling bearing 9. The sheet metal part 15 is arranged an axial distance from a corresponding sheet metal part 17 of the second flywheel mass arrangement 11. A coupling mass arrangement 19 is connected between the two flywheel mass arrangements 5, 11 to transmit torques between the two flywheel mass arrangements 5, 11. The coupling mass arrangement 19 has an elongate connecting part 21 which is positioned axially between the two sheet metal parts 15, 17 and extends radially and/or in the circumferential direction, depending on the operating position. One end of the elongate connecting part 21 has a bearing region comprising a roller 25 rotatably mounted on a sliding bearing for rotating about an axis of rotation 23 parallel to the axis of rotation 1 of the flywheel mass arrangements 5, 11. The roller 25 engages a recess 27 of the sheet metal part 15. The other end of the elongate connecting part 21 has a bearing region comprising a roller 29 rotatably mounted about an axis of rotation 31 offset axially parallel to the axis of rotation 23 and which engages a recess 33 of the sheet metal part 17.

Figure 2A:
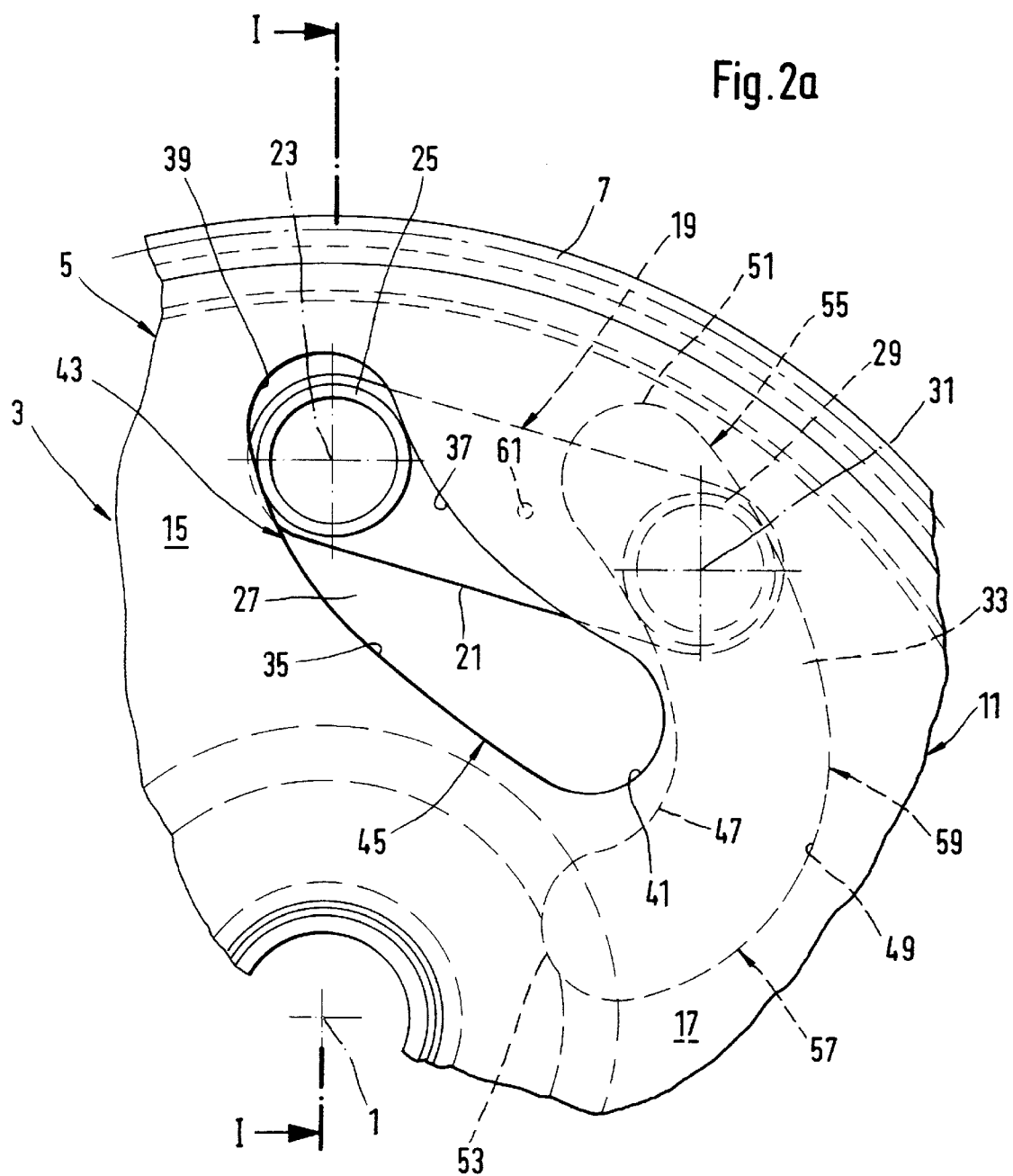
FIGS. 2a–2c are views along a direction of the axis of rotation of the torsional vibration damper of FIG. 1 showing different relative rotary positions of its two flywheel mass arrangements.

Referring now also to FIG. 2a, the recesses 27, 33 in each case have an elongate curved shape. The recess 27, which has a degree of curvature which varies from one end to another, is delimited on its longitudinal sides by two guide tracks 35, 37 which are located opposite and at a distance from one another and along which the roller 25 of the coupling mass arrangement 19 can move in translational motion. The distance between the guide tracks 35, 37 is selected to be slightly greater than the diameter of the roller 25, so that the roller 25 is guided, essentially free of play, between the guide tracks 35, 37, but rolls in a friction-reducing manner on one of the guide tracks 35, 37. The translational movement of the roller 25 along the guide tracks 35, 37 is restricted by semicircular connecting surfaces 39, 41 which connect the guide tracks 35, 37 and are located opposite one another and which form end stops for the roller 25 in recess 27. The recess 27 and its guide tracks 35, 37 extend in a curved run from a radially outer end region 43 to a radially inner end region 45. In addition, due to the curvature, the radially outer end region 43 of the recess 27 with the associated guide tacks 35, 37 is oriented to a greater extent in the radial direction than the radially inner end region 45. The recess 27 and the associated guide tracks 35, 37 extend substantially circumferentially in the radially inner region 45. Moreover, the degree of curvature of the guide tracks 35, 37 decreases continuously in the radially inward direction. The radially inner end region 45 being arranged after the radially outer end region 43 in the clockwise direction in FIG. 2a.

The recess 33 of the sheet metal part 17 likewise has a curved shape which, however, is U-shaped. Guide tracks 47, 49 run along the longitudinal sides of the recess 33 and are delimited by connecting surfaces 51, 53 which form end stops for the roller 29. The distance between the guide tracks 47, 49 is dimensioned such that the rollers 29 move essentially free of play along and between the guide tracks 47, 49 in translational motion by rolling on one of the guide tracks 47, 49.

The U-shaped recess 33 and its guide tracks 47, 49 have a first leg formed by a radially outer end region 55 which extends radially outward to a further extent than the outer end region 43 of the recess 27. The second leg of the recess 33 and its guide tracks 47, 49 is formed by a radially inner end region 57 which extends radially inward to a further extent than the inner end region 45 of the recess 27. The inner end region 45 extends radially inward approximately as far as a U-bend formed by a middle region 59 of the recess 33. The degree of curvature of the guide tracks 47, 49 increases continuously from radially outward to radially inward. The radially inner end region 57 of the recess 33 is arranged after the radially outer end region 55, as viewed in the clockwise direction in FIG. 2a.

Figure 2B:
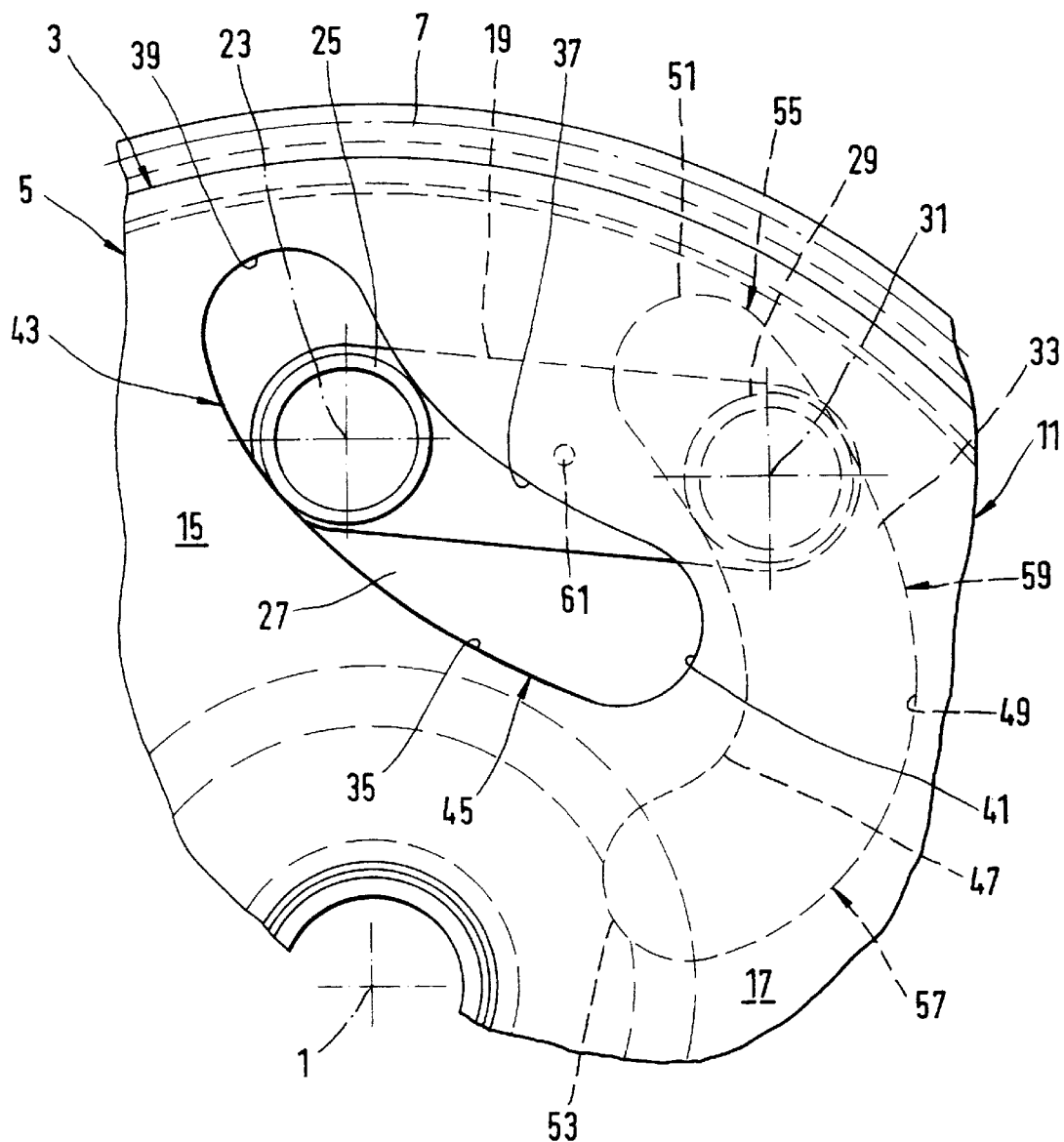
Figure 2C:
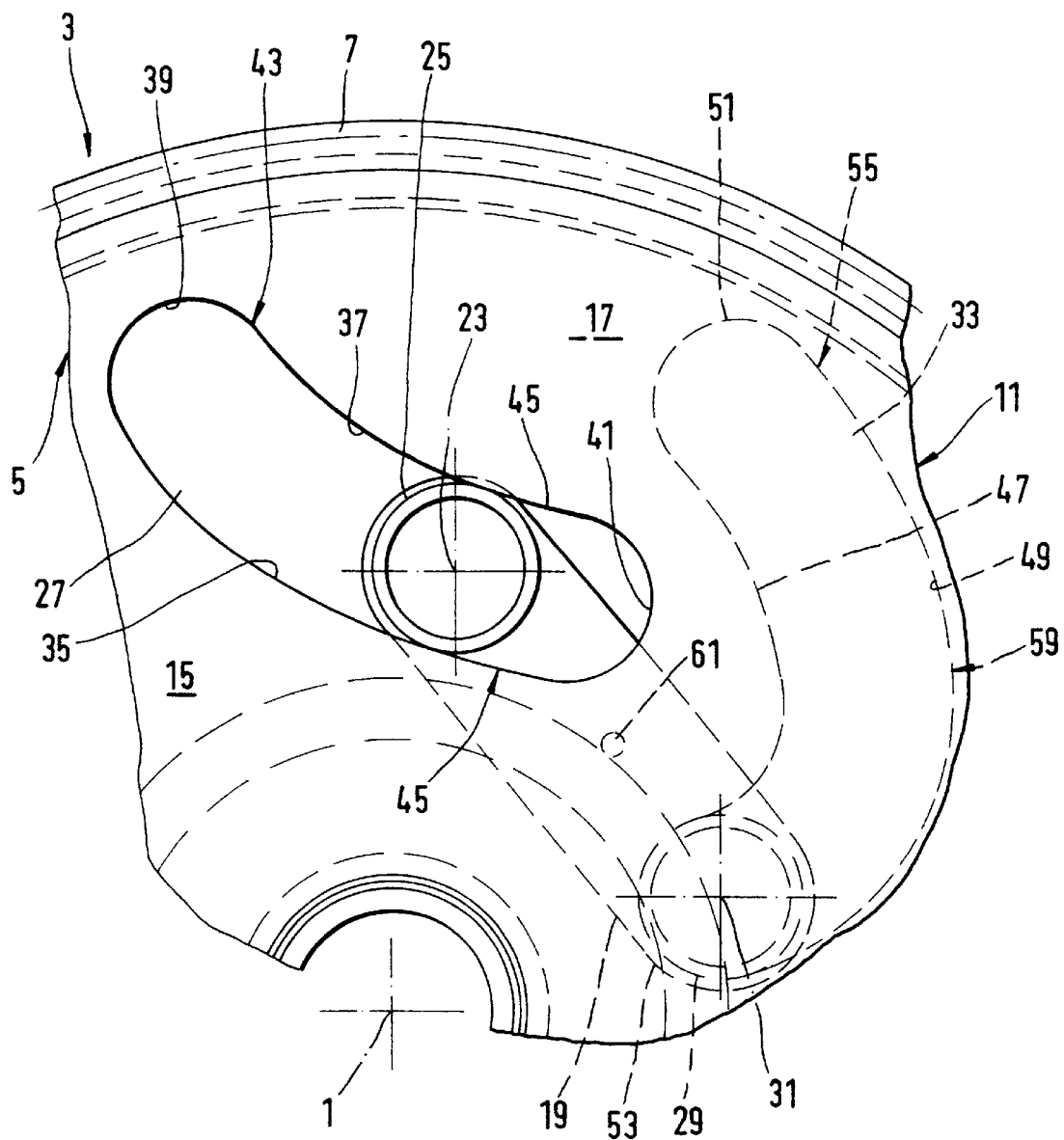

FIGS. 2a to 2c illustrate a sequence of a rotational movement between the flywheel mass arrangements 5 and 11, the first flywheel mass arrangement 5 moving increasingly counterclockwise and the flywheel mass arrangement 11 moving increasingly clockwise.

In the transition from FIG. 2a to FIG. 2b, the position of the roller 29 of the coupling mass arrangement 19 engaging the recess 33 of the second flywheel mass arrangement 11 remains substantially unchanged and the roller 25 of the coupling mass arrangement 19 is displaced radially inward in translation motion along the guide tracks 35, 37 of the recess 27 of the first flywheel mass arrangement 5. This displacement of the roller 25 causes a center of gravity 61 of the coupling mass arrangement 19 to move radially inward and also causes a rotation of the coupling mass arrangement 19 counterclockwise about an axis running through the center of gravity 61 and parallel to the axis of rotation 1. The inertia effect associated with the displacement of the center of gravity 61 due to the inert mass of the coupling mass arrangement 19 and that associated with the rotation about this axis due to the moment of inertia of the coupling mass arrangement 19 produces a force which counteracts the relative rotation of the flywheel mass arrangements 5, 11.

In the transition from FIG. 2b to FIG. 2c, the roller 25 moves further radially inward in the recess 27 and the roller 29 move radially inward in the recess 33. The roller 29 reaches as far as the end stop 53. During this movement, the roller 29 covers a greater radial distance than the roller 25. This greater radial movement of roller 29 and the displacement of the center of gravity 61 of the coupling mass arrangement 19 radially inward, causes a clockwise rotation of the coupling mass arrangement 19 about the axis passing through its center of gravity 61. In the region of the U-bend, the rotational movement is particularly pronounced because the guide tracks 47, 49 are substantially radially oriented. Therefore, the coupling mass arrangement 19 absorbs angular momentum particularly well when it passes through this rotary position range and consequently damps torque fluctuations between the flywheel mass arrangements 5, 11.

If the first flywheel mass arrangement 5 is rotated further counterclockwise beyond the position illustrated in FIG. 2c, the roller 25, too, would come to bear on the end stop 41 of the recess 27, the result of this being that both rollers 25, 29 of the coupling mass arrangement 19 bear on end stops and therefore further rotation of the flywheel mass arrangement 5, 11 is prevented. In this case, the coupling mass arrangement 19 is capable of assuming a second position in which the rotation of the flywheel mass arrangements 5, 11 is likewise limited, specifically the position in which the roller 29 comes to bear on the end stop 51 of the recess 33 opposite the end stop 53 and the roller 25 remains in bearing contact on the end stop 41 of the recess 27.

Various embodiments of the torsional vibration damper illustrated in FIGS. 1 and 2 are explained below. Components corresponding to one another in terms of their design and function are designated by the reference numerals from FIGS. 1 and 2, but are given a letter to distinguish them.

Figure 3C:
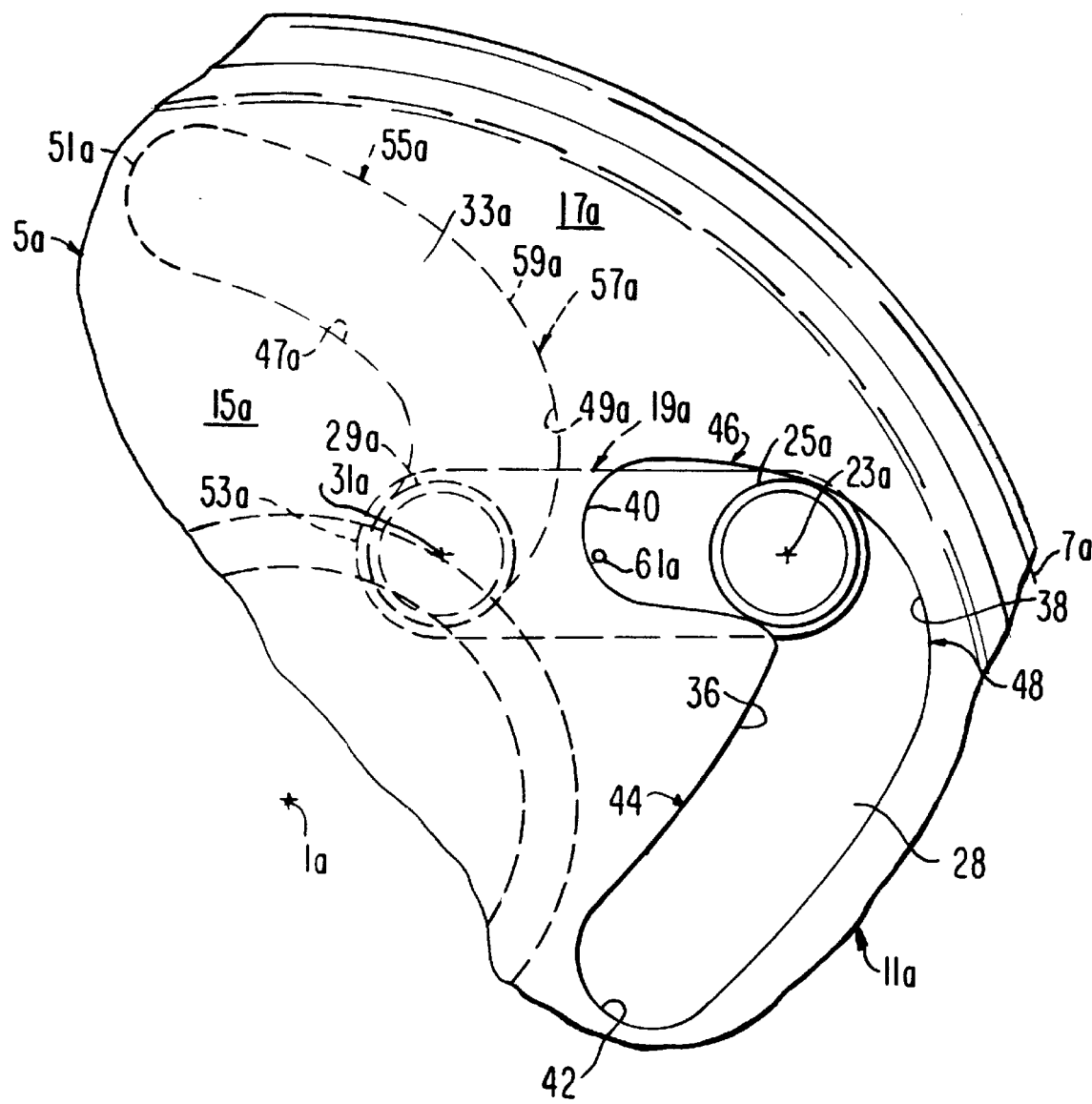

FIGS. 3a and 3b illustrate two different rotary positions of flywheel mass arrangements 5a, 11a of a torsional vibration damper 3a which is essentially similar to the torsional vibration damper described in FIGS. 1 and 2 with two substantially U-shaped recesses 28, 33a. The U-shaped recess 28 of the first flywheel mass arrangement 5a is delimited by guide tracks 36, 38 located opposite one another and by end stops 40, 42 and opens radially inward. That is, legs formed by end regions 44, 46 of the recess 28 are arranged radially inward further than a U-bend formed by a middle region 48 of the recess 28. Moreover, the end region 44 extends radially inward father than the end region 46 preceding it in the clockwise direction. The degree of curvature of the guide surface 38 and the degree of curvature of the guide surface 36 is greatest in the middle region 48.

The likewise U-shaped recess 33a of the second flywheel mass arrangemt 11a corresponds in shape essentially to the U-shaped recess 33 of the second flywheel mass arrangement 11 of the torsional vibration damper described in FIGS. 1 and 2. Accordingly, reference is made here to the above description of the second flywheel mass arrangement 11.

When the first flywheel mass arrangement 5a is in the rotary position with respect to the second flywheel mass arrangement 11a, as illustrated in FIG. 3a, the roller 25a of the coupling mass arrangement 19a bears on one of the guide tracks 36, 38 in the middle region 48 of the recess 28 and the roller 29a of the coupling mass arrangement 19a bears on the end stop 53a of the recess 33a.

During relative rotational movement of the flywheel mass arrangement, 5a, 11a, in the transition from FIG. 3a to FIG. 3b, the first flywheel mass arrangement 5a is displaced counterclockwise and the second flywheel mass arrangement 11a is displaced clockwise. During the relative rotation, the roller 25a engaging the recess 28 of the first flywheel mass arrangement 5a moves circumferentially and radially inward toward the end stop 42 of the end region 44. The roller 29a remains in place on the end stop 53a of the end region 57a of the recess 33a. Therefore, the center of gravity 61a of the coupling mass arrangement 19a moves radially inward and the coupling mass arrangement 19a executes a clockwise rotation about the axis passing through its center of gravity 61a.

As is apparent from FIG. 3a, the recesses 28, 33a are designed such that the coupling mass arrangement 19a is transferable out of a first position such as, for example, shown in FIGS. 3a and 3b in which the roller 25a engaging the first flywheel mass arrangement 5a is arranged before the roller 29a engaging into the second flywheel mass arrangement 11a in the clockwise direction, into a second position in which the roller 29a is arranged before the roller 25a in a clockwise direction. This transfer is possible because the maximum radial/distance between the recesses 28, 33a is greater than the distance between the rollers 25a, 29a.

In FIG. 4, a recess 27b of another embodiment of the torsional vibration damper illustrated in FIGS. 1 and 2, includes end stops 39b, 41b limiting the translational movement of a roller 25b movable between guide tracks 35b, 37b that each have an elastic element 63 that is made from plastic and which damps the butting of the roller 25b onto the end stops 39b, 41b. In addition, the two guide tracks 35b, 37b located opposite one another in the embodiment of recess 27b are arranged at a distance from one another which is greater than the diameter of the roller 25b, so that the roller 25b is guided between the guide tracks 35b, 37b with a play s perpendicular to the direction of translational motion along the guide tracks 35b, 37b.

FIG. 5 illustrates a front view of a first flywheel mass arrangement 5c, rotatable about an axis of rotation 1c, of a torsional vibration damper 3c which is part of a clutch disk. For this purpose, the first flywheel mass arrangement 5c comprise frictional linings, not illustrated, of the clutch disk and a second flywheel mass arrangement 11c, likewise rotatable about the axis of rotation 1c, may be connected to a gear input shaft, likewise not illustrated. The torsional vibration damper 3c comprises four coupling mass arrangements 19c, which are uniformly distributed about its axis of rotation 1c. Each of four coupling mass arrangements 19c comprises a first roller 25c and a second roller 29c arranged at a distance from the latter. The second flywheel mass arrangement 11c has four recesses 33c uniformly distributed about the axis of rotation 1c and which correspond essentially to the recesses 33 of FIG. 2. Each of the rollers 29c of the coupling mass arrangements 19c engage one of the four recesses 33c. Each of the other rollers 25c of the coupling mass arrangements 19c engages a recess 65 provided on the first flywheel mass arrangement 5c. The recess 65 is not delimited by end stops. Rather, the recess 65 extends continuously about the axis of rotation 1c. The recess 65 has four radially outer regions 67 distributed uniformly about the axis of rotation 1c and four radially inner regions 69 arranged between each circumferentially adjacent pair of the four radially outer regions 67. The recess 65 is delimited on its radially inward side by a guide track 71 and on its radially outward side by a guide track 73. During operation, the centrifugal forces acting on the coupling mass arrangements 19c attempt to press the coupling mass arrangements 19c radially outward. The centrifugal forces also attempt to arrange the rollers 25c along the guide tracks 71, 73 in the radially outer regions 67 of the recess 65. Under the effect of a tensile force on the coupling mass arrangements 19c which occurs when torque is transmitted between the flywheel mass arrangements 5c, 11c, the rollers 25c of the coupling mass arrangements 19c are displaced radially inward in the direction of the radially inner regions 69 of the recess 65, until an equilibrium is established between the substantially circumferentially oriented tensile forces and the radially directed centrifugal forces. However, if the torque to be transmitted between the two flywheel mass arrangements 5c, 11c increases above a specific value, the rollers 25c are forced into the radially inner regions 69, counter to the action of the centrifugal forces, due to the inclination of the guide tracks 71, 73 in conjunction with the tensile forces transmitted by the coupling mass arrangements 19c. If the torque is above the specific value, the rollers 25c pass through these radially inner regions 69 and thereupon enter the adjacent radially outer regions 67 which, in each case, are nearest in the circumferential direction, and move further into this again nearest adjacent radially outer region 67. Unrestricted rotation between the two flywheel mass arrangements 5c, 11c is thus possible, thereby affording effective overload protection for the torsional vibration damper.

Although uses of the torsional vibration damper, in which the first flywheel mass arrangement is employed on the input side and the second flywheel mass arrangement on the output side, were described in the preceding exemplary embodiments, it is also possible to reverse the positions of the first and second flywheel mass arrangements.

Furthermore, a torsional vibration damper having only one coupling mass arrangement was described in each case with reference to FIGS. 1 to 3, but these torsional vibration dampers may also comprise a plurality of coupling mass arrangements distributed about the axis of rotation. In this embodiment, a corresponding number of recesses, likewise distributed about the axis of rotation, are also provided in the first and the second flywheel mass arrangements.

In the exemplary embodiments described previously, a further guide track is, in each case, located opposite and at a distance from each guide track, so that the translational movement of the bearing regions of the coupling mass arrangements between these guide tracks is guided with or without play. However, embodiments having only one bearing region without an opposite bearing region are also possible.

In addition to the embodiment of the torsional vibration damper, as illustrated in FIG. 5, in which the first flywheel mass arrangement has a continuous guide track recess 65 extending about the axis of rotation and the second flywheel mass arrangement has a plurality of guide tracks limited by end stops, further embodiments may comprise continuous guide track recesses 65 extending about the axis of rotation on both the first and second flywheel mass arrangements.

The invention is not limited by the embodiments described above which are presented as examples only but can be modified in various ways within the scope of protection defined by the appended patent claims.

I claim:

1. A torsional vibration damper, comprising:
   a first flywheel mass arrangement rotatable about an axis of rotation and having a first guide track;
   a second flywheel mass arrangement rotatable relative to said first flywheel arrangement about said axis of rotation and having a second guide track;
   a coupling mass arrangement for coupling said first flywheel mass to said second flywheel mass comprising a first bearing region movably arranged for translational motion along said first guide track for transmitting torsional forces to said first flywheel mass and a second bearing region movably arranged for translational motion along said second guide track for transmitting torsional forces to said second flywheel mass;
   said second bearing region arranged at a fixed distance from said first bearing region with respect to a plane oriented perpendicular to said axis of rotation and wherein said first and second guide tracks are operatively designed such that said coupling mass arrangement is transferable from a first position, in which said first bearing region is arranged in front of said second bearing region in a clockwise circumferential direction, to a second position, in which said first bearing region is arranged behind said second bearing region in said clockwise circumferential direction; and
   a further guide track arranged in opposition to and at a distance from at least a portion of said first guide track so that said first bearing region is movably guided between said further guide track and said first guide track, along one of said further guide track and said first guide track.

2. The torsional vibration damper of claim 1, wherein said first bearing region is movably guided between said first guide track and said further guide track with a predetermined amount of play perpendicular to the direction of said translational motion.

3. The torsional vibration damper of claim 1, wherein said first bearing region is movably guided between said first guide track and said further guide track without play perpendicular to the direction of said translational motion.

4. The torsional vibration damper of claim 1, wherein said second flywheel mass arrangement is mounted relative to said first flywheel mass arrangement by a rotary bearing and said second flywheel mass arrangement is mounted on a radially inner surface of said rotary bearing.

5. A torsional vibration damper, comprising:
   a first flywheel mass arrangement rotatable about an axis of rotation and having a first guide track;
   a second flywheel mass arrangement rotatable relative to said first flywheel arrangement about said axis of rotation and having a second guide track;
   a coupling mass arrangement for coupling said first flywheel mass to said second flywheel mass comprising a first bearing region movably arranged for translational motion along said first guide track for transmitting torsional forces to said first flywheel mass and a second bearing region movably arranged for translational motion along said second guide track for transmitting torsional forces to said second flywheel mass; and
   said second bearing region arranged at a distance from said first bearing region with respect to a plane oriented perpendicular to said axis of rotation,
   wherein said first guide track comprises two end regions, each said end regions comprising an end stop limiting the translational motion of said first bearing region and wherein at least one of said end stops comprises an elastic damping element.

6. A torsional vibration damper, comprising:
   a first flywheel mass arrangement rotatable about an axis of rotation and having a first guide track;
   a second flywheel mass arrangement rotatable relative to said first flywheel arragement about said axis of rotation and having a second guide track;
   a coupling mass arrangement for coupling said first flywheel mass to said second flywheel mass comprising a first bearing region movably arranged for translational motion along said first guide track for transmitting torsional forces to said first flywheel mass and a second bearing region movably arranged for translational motion along said second guide track for transmitting torsional forces to said second flywheel mass; and
   said second bearing region arranged at a distance from said first bearing region with respect to a plane perpendicular to said axis of rotation,
   wherein said first guide track comprises two end regions, each said end regions comprising an end stop limiting the translational motion of said first bearing region, wherein said each said first guide track and said second guide track comprises a curved run, with respect to a plane oriented transversely to said axis of rotation, and wherein said first guide track comprises a radially inner end region and a radially outer end region, said radially inner end region having a smaller angle with respect to a circumferential direction than said radially outer end region.

7. The torsional vibration damper of claim 6, wherein said radially inner end region is oriented in said circumferential direction.

8. The torsional vibration damper of claim 6, wherein said second guide track comprises an essentially U-shaped run having end regions forming legs which are connected by a middle region, said middle region forming a U-bend.

9. The torsional vibration damper of claim 8, wherein said second guide track is oriented such that said U-bend opens substantially toward said circumferential direction.

10. A torsional vibration damper, comprising:
   a first flywheel mass arrangement rotatable about an axis of rotation and having a first guide track;
   a second flywheel mass arrangement rotatable relative to said first flywheel arrangement about said axis of rotation and having a second guide track;
   a coupling mass arrangement for coupling said first flywheel mass to said second flywheel mass comprising a first bearing region movably arranged for translational motion along said first guide track for transmitting torsional forces to said first flywheel mass and a second bearing region movably arranged for translational motion along said second guide track for transmitting torsional forces to said second flywheel mass; and
   said second bearing region arranged at a distance from said first bearing region with respect to a plane perpendicular to said axis of rotation,
   wherein said first guide track comprises two end regions, each said end regions comprising an end stop limiting the translational motion of said first bearing region, wherein said each said first guide track and said second guide track comprises a curved run, with respect to a plane oriented transversely to said axis of rotation, and wherein said first guide track comprises a radially inner end region and a radially outer end region, said radially inner end region having a smaller angle to a circumferential direction than said radially outer end region, and wherein the second guide track comprises an essentially U-shaped run with a U-bend opening substantially in said circumferential direction.

11. The torsional vibration damper of claim 10, wherein said second guide track comprises a radially inner end region and a radially outer end region and said radially inner end region of said first guide track is arranged radially between said end regions of said second guide track.

12. The torsional vibration damper of claim 11, wherein said radially outer end region of said second guide track extends radially outward further than said radially outer end region of said first guide track.

13. The torsional vibration damper of claim 11, wherein said radially outer end region of said first guide track is arranged before said radially inner end region of said first guide track along said circumferential direction, and said end regions of the second guide track are arranged before said U-bend of said second guide track along said circumferential direction.

14. The torsional vibration damper of claim 13, wherein said radially outer end region of said second guide track is arranged before said radially inner end region of said second guide track along said circumferential direction.

* * * * *